(12) United States Patent
Boday et al.

(10) Patent No.: US 9,765,188 B2
(45) Date of Patent: Sep. 19, 2017

(54) HIGH MOLECULAR WEIGHT POLYTHIOAMINALS FROM A SINGLE MONOMER

(71) Applicant: International Business Machines Corporation, Armonk, NY (US)

(72) Inventors: Dylan J. Boday, Austin, TX (US); Jeannette M. Garcia, San Leandro, CA (US); James L. Hedrick, Pleasanton, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/287,419

(22) Filed: Oct. 6, 2016

(65) Prior Publication Data

US 2017/0121461 A1 May 4, 2017

Related U.S. Application Data

(62) Division of application No. 14/930,435, filed on Nov. 2, 2015, now Pat. No. 9,534,084.

(51) Int. Cl.
*C08G 75/00* (2006.01)
*C08G 75/02* (2016.01)
*C08G 75/0236* (2016.01)

(52) U.S. Cl.
CPC ..... *C08G 75/0272* (2013.01); *C08G 75/0236* (2013.01)

(58) Field of Classification Search
CPC .................................. C08G 75/23; C08K 7/24
See application file for complete search history.

(56) References Cited

U.S. PATENT DOCUMENTS

| | | | |
|---|---|---|---|
| 2,191,753 A | 2/1940 | Coffman et al. |
| 2,889,277 A | 6/1959 | Hughes |
| 3,340,232 A | 9/1967 | Smith et al. |
| 3,598,748 A | 8/1971 | Hirosawa |
| 3,957,742 A | 5/1976 | Kveton |
| 4,086,211 A | 4/1978 | Nakauchi et al. |
| 4,106,904 A | 8/1978 | Oude Alink et al. |
| 4,224,417 A | 9/1980 | Hajek et al. |
| 4,225,481 A | 9/1980 | Wagner |
| 4,246,160 A | 1/1981 | Wagner et al. |
| 4,301,262 A | 11/1981 | Wagner et al. |
| 4,839,460 A | 6/1989 | Molzahn |
| 4,877,451 A | 10/1989 | Winnik et al. |
| 5,112,796 A | 5/1992 | Iannicelli |
| 5,554,349 A | 9/1996 | Rivers et al. |
| 5,674,377 A | 10/1997 | Sullivan, III et al. |
| 5,795,560 A | 8/1998 | Reed |
| 5,830,243 A | 11/1998 | Wolak et al. |
| 5,958,352 A | 9/1999 | Callaway et al. |
| 6,132,933 A | 10/2000 | Nguyen |
| 6,419,945 B1 | 7/2002 | Gresser et al. |
| (Continued) |

FOREIGN PATENT DOCUMENTS

| | | |
|---|---|---|
| CN | 101265255 A | 9/2008 |
| CN | 101343421 A | 1/2009 |
| (Continued) |

OTHER PUBLICATIONS

Zhu et al. (Journal of Polymer Science: Part A: Polymer Chemistry, vol. 40, 1321-1333 (2002)).

(Continued)

*Primary Examiner* — Shane Fang
(74) *Attorney, Agent, or Firm* — Patterson + Sheridan, LLP

(57) ABSTRACT

Compounds include polythioaminals of the formula:

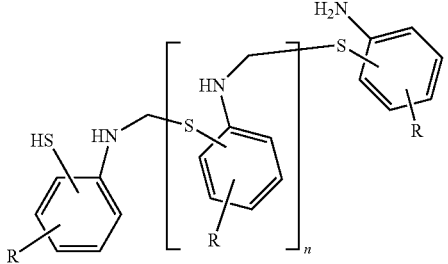

Each instance of R may be hydrogen or an electron withdrawing group. 'n' may be an integer such that the number average molecular weight (Mn) or weight average molecular weight (Mw) is between about 2,000 to about 80,000. Compounds also include polythioaminals of the formula:

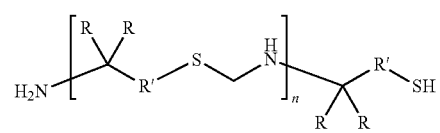

Each instance of R may be independently selected from the group consisting of —H, —F, —CF$_3$, and —NO$_2$. Each instance of R' may be independently selected from the group consisting of cycloalkyl, alkyl, alkylene glycol, acrylate, and siloxane. 'n' may be an integer such that the number average molecular weight (Mn) or weight average molecular weight (Mw) is between about 2,000 to about 80,000.

17 Claims, No Drawings

(56) References Cited

U.S. PATENT DOCUMENTS

| | | | |
|---|---|---|---|
| 6,541,181 | B1 | 4/2003 | Levanon et al. |
| 6,566,035 | B1 | 5/2003 | Aoshima |
| 6,641,978 | B1 | 11/2003 | Chapman et al. |
| 6,911,300 | B2 | 6/2005 | Sato et al. |
| 7,384,434 | B2 | 6/2008 | Malfer et al. |
| 7,652,119 | B2 | 1/2010 | Wakabayashi et al. |
| 7,989,146 | B2 | 8/2011 | Burberry et al. |
| 8,389,205 | B2 | 3/2013 | Duerig et al. |
| 8,450,043 | B2 | 5/2013 | Coady et al. |
| 8,562,964 | B2 | 10/2013 | Ljubimova et al. |
| 8,574,815 | B2 | 11/2013 | Coady et al. |
| 8,632,947 | B2 | 1/2014 | Bentley et al. |
| 9,120,897 | B1 | 9/2015 | Boday et al. |
| 9,228,059 | B2 | 1/2016 | Boday et al. |
| 9,388,281 | B2 | 7/2016 | Boday et al. |
| 9,534,084 | B1 | 1/2017 | Boday et al. |
| 9,550,863 | B1 | 1/2017 | Boday et al. |
| 2003/0039689 | A1 | 2/2003 | Chen et al. |
| 2004/0060405 | A1 | 4/2004 | Kao |
| 2007/0077511 | A1 | 4/2007 | Tredwell et al. |
| 2009/0039018 | A1 | 2/2009 | Jordi et al. |
| 2009/0250659 | A1 | 10/2009 | Gatlin |
| 2010/0048756 | A1 | 2/2010 | Loccufier et al. |
| 2010/0107476 | A1 | 5/2010 | Cosimbescu |
| 2011/0271096 | A1 | 11/2011 | Bharrat et al. |
| 2012/0049308 | A1 | 3/2012 | Nishimura et al. |
| 2012/0232328 | A1 | 9/2012 | Gwenin et al. |
| 2014/0013425 | A1 | 1/2014 | Samson |
| 2017/0049902 | A1 | 2/2017 | Hedrick et al. |

FOREIGN PATENT DOCUMENTS

| | | | | |
|---|---|---|---|---|
| EP | 2636697 | A1 | 9/2013 | |
| GB | 535577 | A | 4/1941 | |
| GB | 928112 | A | 6/1963 | |
| GB | 942932 | A | 11/1963 | |
| GB | 1531578 | A | 11/1978 | |
| JP | 36007652 | * | 5/1985 | ............... C08G 8/16 |
| JP | 2006516548 | A | 7/2006 | |
| JP | 2006519766 | A | 8/2006 | |
| WO | 0166614 | A2 | 9/2001 | |
| WO | 0198388 | A1 | 12/2001 | |
| WO | 0226849 | A1 | 4/2002 | |

OTHER PUBLICATIONS

Appendix P: List of IBM Patents or Patent Applications Treated as Related, 2015.

U.S. Appl. No. 15/334,156 entitled "Polymers From Stabilized Imines," filed Oct. 25, 2016.

U.S. Appl. No. 15/287,419 entitled "High Molecular Weight Polythioaminals From A Single Monomer," filed Oct. 6, 2016.

U.S. Appl. No. 14/952,488 entitled "Polythioaminal Dispersions and Coatings," filed Nov. 25, 2015.

U.S. Appl. No. 15/249,218 entitled "Polymers From Stabilized Imines," filed Aug. 26, 2016.

Gavin O. Jones et al., Computational and Experimental Studies on the Mechanism of Formation of Poly (hexahydrotriazine)s and Poly(hemiaminal)s from the Reactions of Amines with Formaldehyde: Organic Letters, 2014, 5502-5505, American Chemical Society, USA.

Katrin Knop, Richard Hoogenboom, Dagmar Fischer, and Ulrich S. Schubert, Poly(ethylene glycol) in Drug Delivery: Pros and Cons as Well as Potential Alternatives. Angewandte Chemie, 2010, 6288-6308, Niley-VCH Verlag GmbH & Co. KGaA Weinheirn.

Stuart J. Rowan, Stuart J. Cantrill, Graham R L Cousins, Jeremy K. M. Sanders, and J. Fraser Stoddart, Dynamic Covalent Chemistry, Angew. Chem. Int. Ed. 2002, 41, 898 ± 952, Wiley-VCH Verlag GmbH, 69451 Weinheim, Germany.

Jeannette M. Garcia et al., Recyclable, Strong Thermosets and Organogels via Paraformaldehyde Condensation with Diamines. Science, 344, 132 (2014), American Association for the Advancement of Science, USA.

G. Saito et al./Advanced Drug Delivery Reviews 55 (2003) 199-215, Elsevier Science B.V., USA.

Rudy J. Wojtecki, Michael A. Meador and Stuart J. Rowan, Using the Dynamic Bond To Access Macroscopically Responsive Structurally Dynamic Polymers, Mature Materials vol. 10 Jan. 2011, Macmillan Publiers Limited, USA.

Henri Ulrich et al. Reaction of Chloromethyl Ether with Primary Amines, May 1961, pp. 1637-1638.

Hemant S. Patel et al., Studies on Synthesis and Characterization of some Novel Aromatic Copolyesters based on s-Triazine, Iranian Polymer Journal, vol. 14, No. 12, 2005, pp. 1090-1098.

Cabin Suriano et al. Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.

Hydrogen Sulfide Management. Mitigation options in petroleum refining, storage and transportation, White Paper, Baker Hughes, pp. 1-12 2014.

Wang Yulan et al., Synthesis and Properties of Poly-1, 3, 5-Triazines, Polymer Communications, No. 2, '1984, pp. 117-123.

John Markoff, Error at IBM Lap Finds New Famiiy of Materials, New York Times, May 15, 2014, 4 pages.

D. R. Anderson et al., Thermally resistance polymers containing the S—friazine ring, Journal of Polymer Science Part A-1: PolyrnerO;ernistry, vol. 4, Issue 7, pp. 1689-1702.

Raquel Lebrero et al.. Odor abatement in biotrickling filters: Effect of the EBRT on methyl mercaptan and hydrophobic VOCs removal, Bioresource Technology, Special Issue: Innovative Researches on Algal Biomass. vol. 109, Apr. 2012, pp. 38-45.

Elbert, et al. "Conjugate Addition Reactions Combined with Free-Radical Cross-Linking for the Design of Materials or Tissue Engineering," Biomacromolecules 2001, 2. 430-441; Published on Web Mar. 3, 2001.

Ferrar, "Reactions Of Formaldehyde With Aromatic Amines," J. Appl. Chem, 14, 1964, 389-399.

Geng, et al., "Nanoindentation behavior of ultrathin polymeric films," Polymer 46 (2005) 11768—1 1772; Available online Oct. 19, 2005.

Hiller, et al. "Laser-engraveable hexahydrotriazine polymer networks," Mat Res Innovat (2002) 6: 179-184.

Oliver, et al. "Measurement of hardness and elastic modulus by; instrumented indentation: Advances in understanding and; refinements to methodology," J. Mater. Res., vol. 19, No. 1, Jan 2004, 3-20.

Singh, et al., "Ultrasound mediated Green Synthesis of Hexa-hydro Triazines," J. Mater. Environ. Sci. 2 (4) (2011) 403-406.

Stafford, et al., "A buckiing-based metroiogy for measuring; the elastic moduli of polymeric thin films," Nature Materials_3_Aug. 2004, 545-550; Published online: Jul. 11, 2004.

Ekinci et al., "Preparation, Characterization and H202 Selectivity of Hyperbranched Polyimides Containing Triazine". Journal of Polymer Research, 2005, pp. 205-210.

International Business Machines Corporation, "List of IBM Patents or Patent Applications," as filed on Apr. 7, 2017.

* cited by examiner

HIGH MOLECULAR WEIGHT POLYTHIOAMINALS FROM A SINGLE MONOMER

CROSS-REFERENCE TO RELATED APPLICATIONS

This application is a divisional of co-pending U.S. patent application Ser. No. 14/930,435, filed Nov. 2, 2015. The aforementioned related patent application is herein incorporated by reference in its entirety.

FIELD

The present disclosure relates to polythioaminals and synthesis of polythioaminals.

BACKGROUND

Polythioaminals are a class of polymers with a variety of uses, including drug delivery. Some polythioaminals are polymers that have the general structure:

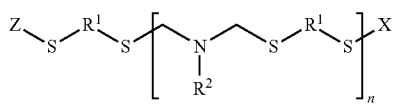

where $R^1$ and $R^2$ are organic or hetero-organic species. It has been shown that polythioaminals having the above structure may be synthesized by reacting an N-substituted hexahydrotriazine with a dithiol, as follows:

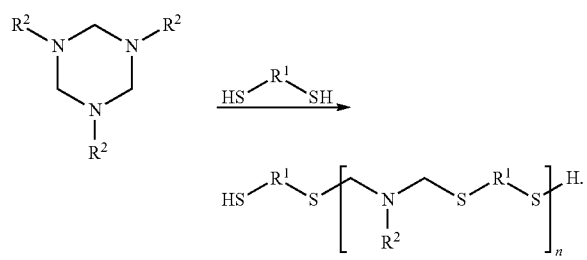

Subsequent reactions may replace the hydrogen atoms at the end of the thioaminal polymer with the X and Z groups above.

Whether a polythioaminal can achieve a high molecular weight during polymerization is significantly affected by stoichiometric ratios of starting materials, in view of the Carother's equation. The Carother's equation states that the degree of polymerization of a monomer (into a polymer) is equal to $1/(1-p)$, where p is the extent of conversion of a monomer. Small changes in the stoichiometry of one of the polymerization reactants may significantly affect the molecular weight of a synthesized polymer.

Furthermore, the reaction shown above generates a byproduct amine $R_2$—$NH_2$. As the reaction proceeds, concentration of the byproduct amine grows to an extent that limits progress of the reaction from achieving high degrees of polymerization. If the byproduct amine is not removed, molecular weight of the polymer generally does not grow above about 5,000 Daltons. Amine scavengers may be added to the polymerization reaction to capture $R_2$—$NH_2$ species. If the reaction is performed at elevated temperature, volatile byproduct amines may be vaporized to drive the reaction to higher molecular weight. However, some thioaminal polymers tend to decompose at temperatures above about 200° C., so use of such methods to increase molecular weight is limited.

Furthermore, growth of polythioaminals on substrate surfaces via two monomeric starting materials (e.g., dithiols and hexahydrotriazines) generally yields polythioaminals of less than about 5,000 Daltons.

Broadly applicable methods of increasing molecular weight of polythioaminals are needed.

SUMMARY

The present disclosure describes compounds of the formula:

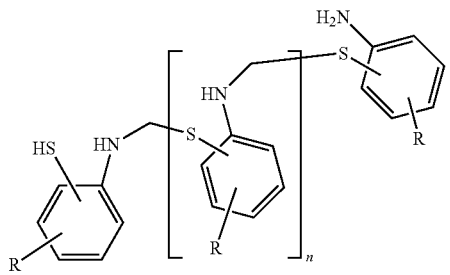

Each instance of R may be hydrogen or an electron withdrawing group. 'n' may be an integer such that the number average molecular weight (Mn) or weight average molecular weight (Mw) is between about 2,000 to about 80,000.

The present disclosure further describes compounds of the formula:

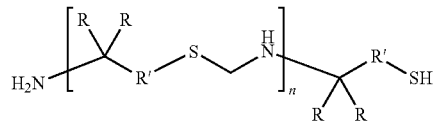

Each instance of R may be independently selected from the group consisting of —H, —F, —$CF_3$, and —$NO_2$. Each instance of R' may be independently selected from the group consisting of cycloalkyl, alkyl, alkylene glycol, acrylate, and siloxane. 'n' may be an integer such that the number average molecular weight (Mn) or weight average molecular weight (Mw) is between about 2,000 to about 80,000.

The present disclosure further describes methods of synthesizing a polythioaminal including mixing a thiol amine with an aldehyde to form a thiol imine. Methods may include self-polymerizing the thiol imine to form a polythioaminal. The number average molecular weight (Mn) or weight average molecular weight (Mw) of the polythioaminal may be between about 2,000 to about 80,000.

DETAILED DESCRIPTION

Embodiments described herein generally relate to polythioaminals and synthesis of polythioaminals. Compounds, compositions, and methods described herein may take advantage of aminothiophenols for achieving high molecular weight polythioaminals. This strategy may be extended beyond aromatic monomers to aliphatic materials bearing electron withdrawing groups near primary amines. Compounds, compositions, and methods described herein also take advantage of stable imines as well as stable polythioaminals by judicious selection of electron withdrawing groups and structural location of the electron withdrawing groups.

The present disclosure describes methods of synthesizing high molecular weight polythioaminals from substituted aminothiophenols and/or aliphatic amino thiols. In some embodiments, a "high molecular weight" polythioaminal described herein has a number average molecular weight (Mn) or weight average molecular weight (Mw) between about 5,500 to about 40,000, such as between about 10,000 to about 25,000, such as between about 15,000 to about 20,000.

The present disclosure describes methods of synthesizing aromatic polythioaminals of the general structure (1):

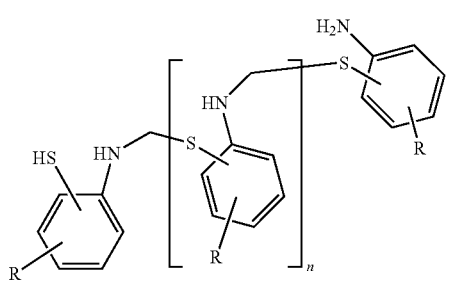

where R may be hydrogen or an electron withdrawing group, and the structure independently has one, two, three, or four R groups on the phenyl rings. Electron withdrawing groups include —F, —CF$_3$, —NO$_2$, —Cl, —Br, —I, nitrile, and the like. Each instance of R may be independently selected from the group consisting of —F, —CF$_3$, and —NO$_2$. 'n' of the polythioaminal of general structure (1) may be an integer such that the number average molecular weight (Mn) or weight average molecular weight (Mw) of a polythioaminal of general structure (1) is between about 2,000 to about 80,000, such as about 5,500 to about 40,000, such as between about 10,000 to about 25,000, between about 15,000 to about 20,000. In some embodiments, the —NH— moiety is para- to the —S— moiety. In some embodiments, at least one of the electron withdrawing groups is ortho- and/or para- to the —NH— moiety.

The present disclosure describes methods of synthesizing aliphatic polythioaminals of the general structures (2):

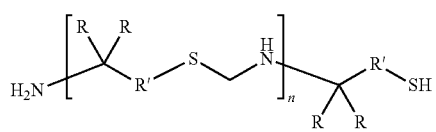

where R is hydrogen or an electron withdrawing group. Electron withdrawing groups include —F, —CF$_3$, —NO$_2$, —Cl, —Br, —I, nitrile, and the like. In some embodiments, each instance of R is independently selected from the group consisting of —H, —F, —CF$_3$, and —NO$_2$. R' is a linker moiety. Each instance of R' is independently selected from the group consisting of cycloalkyl, alkyl, alkylene glycol, acrylate, and siloxane. In some embodiments, alkylene glycol is polyalkylene glycol, acrylate is polyacrylate, and siloxane is polysiloxane. In some embodiments, each instance of R' is independently selected from the group consisting of cyclohexyl, n-butyl, polyethylene glycol, polymethylacrylate, and polydimethysiloxane. 'n' of the polythioaminal of general structure (2) may be an integer such that the number average molecular weight (Mn) or weight average molecular weight (Mw) of a polythioaminal of general structure (2) is between about 2,000 to about 80,000, such as about 5,500 to about 40,000, such as between about 10,000 to about 25,000, between about 15,000 to about 20,000.

Compounds of structure (1) are generally formed by self-polymerizing a thiophenol imine. Compounds of structure (2) are generally formed by self-polymerizing an aliphatic amino thiol.

Scheme 1a illustrates aromatic polythioaminal synthesis under various reaction conditions.

Scheme 1a

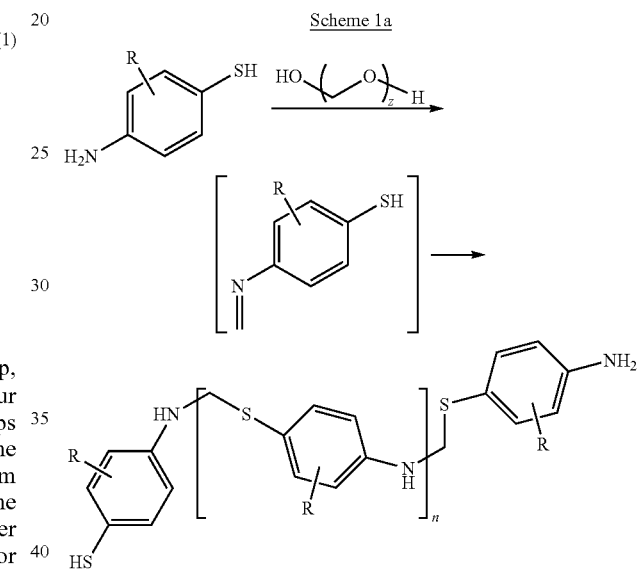

As shown in Scheme 1a, a substituted aminothiophenol is mixed with paraformaldehyde to yield a thiophenol imine product. The thiophenol imine product may be self-polymerized into an aromatic polythioaminal. Self-polymerization may occur by nucleophilic addition of the thiol nucleophile of a first thiophenol imine with the electrophilic carbon of the imine moiety of a second thiophenol imine. 'R' is hydrogen or an electron withdrawing group. Electron withdrawing group includes —F, —CF$_3$, —NO$_2$, —Cl, —Br, —I, nitrile, and the like.

Scheme 1b illustrates aromatic polythioaminal synthesis under various reaction conditions.

Scheme 1b

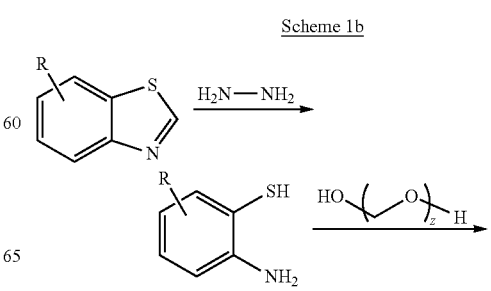

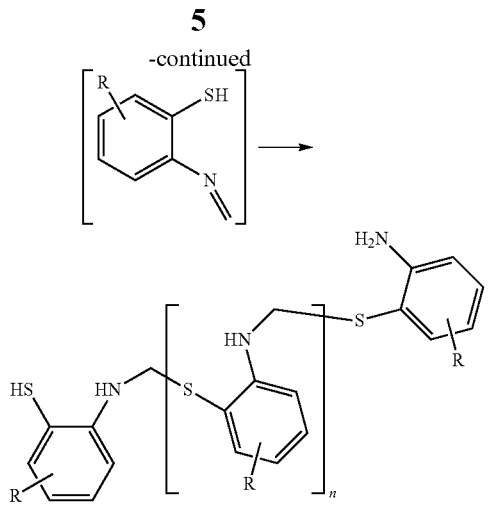

As shown in Scheme 1b, a benzothiazole is mixed with any suitable reducing agent, such as hydrazine, to yield an aminothiophenol. The aminothiophenol product is then mixed with paraformaldehyde to yield a thiophenol imine product. The thiophenol imine product may be self-polymerized into an aromatic polythioaminal. Self-polymerization may occur by nucleophilic addition of the thiol nucleophile of a first thiophenol imine with the electrophilic carbon of the imine moiety of a second thiophenol imine. 'R' is an electron withdrawing group. Electron withdrawing groups include —F, —$CF_3$, —$NO_2$, —Cl, —Br, —I, nitrile, and the like.

Each of the reactions shown in Scheme 1a and Scheme 1b may be carried out at room temperature or the reaction may be heated to between about 30° C. to about 120° C., such as between about 80° C. to about 100° C.

Scheme 2 illustrates aliphatic polythioaminal synthesis under various reaction conditions.

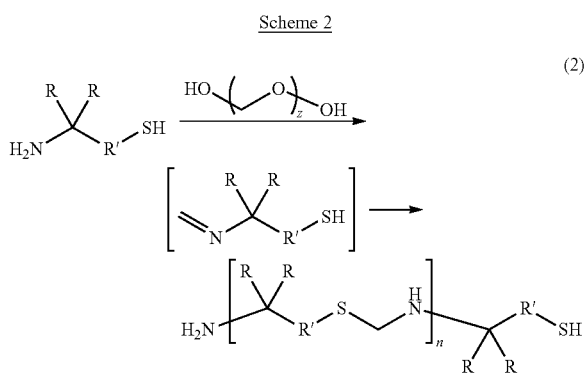

As shown in Scheme 2, an aliphatic amino thiol is mixed with paraformaldehyde to yield an aliphatic thiol imine. The aliphatic thiol imine may be self-polymerized to yield an aliphatic polythioaminal of general structure (2). Self-polymerization may occur by nucleophilic addition of the thiol nucleophile of a first aliphatic thiol imine with the electrophilic carbon of the imine of a second aliphatic thiol imine. R may be hydrogen or an electron withdrawing group. Electron withdrawing groups include —F, —$CF_3$, —$NO_2$, —Cl, —Br, —I, nitrile, and the like. R may be independently selected from the group consisting of —H, —F, —$CF_3$, and —$NO_2$. R' is a linker moiety. Each instance of R' is independently selected from the group consisting of cycloalkyl, alkyl, alkylene glycol, acrylate, and siloxane. In some embodiments, alkylene glycol is polyalkylene glycol, acrylate is polyacrylate, and siloxane is polysiloxane. In some embodiments, each instance of R' is independently selected from the group consisting of cyclohexyl, n-butyl, and polyethylene glycol.

Each of the reactions shown in Scheme 2 may be carried out at room temperature or the reaction may be heated to between about 30° C. to about 120° C., such as between about 80° C. to about 100° C.

Reactions of Scheme 1a, Scheme 1b, and Scheme 2 may be carried out in the presence of a solvent, such as an organic solvent. The organic solvent may be polar. Polar aprotic solvents usable for the methods described herein include N-methyl-pyrrolidone (NMP), dimethylsulfoxide (DMSO), N,N-dimethylformamide (DMF), N,N-dimethylacetamide (DMA), propylene carbonate (PC), propylene glycol methyl ether acetate (PGMEA), and mixtures thereof.

In some embodiments, reactions of Scheme 1a, Scheme 1b, and Scheme 2 provide quantitative yields, allowing a reaction product to be used in a subsequent reaction without first isolating/purifying the reaction product from any byproducts or starting materials. For example, quantitative yields of aromatic polythioaminals or aliphatic polythioaminals allow a polythioaminal product to be used in a subsequent reaction without isolation/purification from any byproducts or starting materials subsequent to polythioaminal formation. Alternatively, a reaction product of Scheme 1a, Scheme 1b, or Scheme 2 may be purified by chromatographic separation, crystallization, and/or extraction with an aqueous solvent and an organic solvent. For example, the reactions of Scheme 1a, Scheme 2, or Scheme 2 may be progressed to quantitative yield, and then reactants can be added directly to the resulting mixture to perform a subsequent reaction.

Equivalents of aldehyde relative to equivalents of an aromatic or aliphatic amino thiol (as shown in Scheme 1a, Scheme 1b, and Scheme 2, respectively) may be greater than one for each of the imine formation reactions shown in Scheme 1a, Scheme 1b, and Scheme 2. In some embodiments, equivalents of aldehyde to equivalents of an aromatic or aliphatic amino thiol is about 1 for each of the imine formation reactions shown in Scheme 1a, Scheme 1b, and Scheme 2. A different aldehyde (i.e., not paraformaldehyde) may be used in addition to or as a replacement of paraformaldehyde. Aldehydes include formaldehyde, acetaldehyde, and polymerized aldehydes such as paraformaldehyde. A ketone, such as acetone, may be used instead of or in addition to an aldehyde. Reactions according to Scheme 1a, Scheme 1b, and Scheme 2 may be carried out in a reaction vessel, such as a glass, round-bottom flask. In some embodiments, the vessel is purged with nitrogen or other inert gas prior to a reaction of Scheme 1a, Scheme 1b, and/or Scheme 2. After a reaction has been carried to a stopping point, such as completion of the reaction, vacuum may then be applied to the vessel to remove volatile byproducts and/or solvent. The starting materials of Scheme 1a, Scheme 1b, and Scheme 2 may be obtained from commercial suppliers, such as Sigma-Aldrich, or may be synthesized.

As shown in Scheme 1a and Scheme 1b, a thiophenol imine may be self-polymerized into an aromatic polythioaminal of general structure (1):

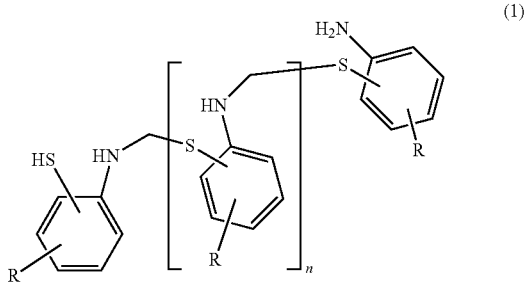

(1)

The thiophenol imines of Scheme 1a and Scheme 1b may be mono-substituted, di-substituted, tri-substituted, or tetra-substituted with an R group. Accordingly, each phenyl ring of the polythioaminal product may be mono-substituted, di-substituted, tri-substituted, or tetra-substituted with an R group. R may be hydrogen or an electron withdrawing group. Electron withdrawing groups include —F, —$CF_3$, —$NO_2$, —Cl, —Br, —I, nitrile, and the like. Each instance of R may be independently selected from the group consisting of —F, —$CF_3$, and —$NO_2$. One or more electron withdrawing R groups of thiophenol imine promotes stabilization of the imine moiety. In some embodiments, the most stable thiophenol imines are those that have an electron withdrawing R group para-relative to the imine moiety, for example, a thiophenol imine of Scheme 1b. In some embodiments, a thiophenol imine has an electron withdrawing R group ortho-relative to the imine moiety, for example, a thiophenol imine of Scheme 1a or Scheme 1b. In some embodiments, a thiophenol imine has an electron withdrawing R group meta-relative to the imine moiety. One or more electron withdrawing R groups promotes stabilization of thioaminal linkages of a polythioaminal.

In some embodiments, the most stable thioaminal linkages are those where the thiol moiety is meta-relative to an electron withdrawing R group and/or the imine moiety. Stabilization of an imine moiety of a thiophenol imine monomer and/or thioaminal linkages of a polythioaminal promotes the formation of high molecular weight polythioaminals. Furthermore, stabilization of the imine moiety of a thiophenol imine reduces or eliminates hexahydrotriazine formation, and a subsequent $R_2$—$NH_2$ byproduct from reaction of the hexahydrotriazine. Therefore, electron withdrawing R groups of a thiophenol imine reduces or eliminates the need for amine scavengers in polythioaminal formation reactions.

In some embodiments, 'n' of the polythioaminal of general structure (1) is an integer such that the number average molecular weight (Mn) or weight average molecular weight (Mw) of a polythioaminal of general structure (1) is between about 2,000 to about 80,000, about 5,500 to about 40,000, such as between about 10,000 to about 25,000, such as between about 15,000 to about 20,000.

As shown in Scheme 2, an aliphatic thiol imine may be self-polymerized into an aliphatic polythioaminal of general structures (2):

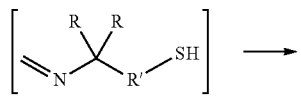

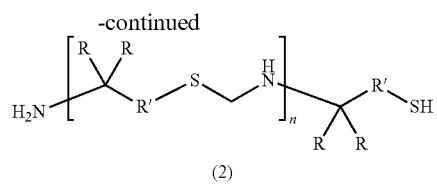

(2)

The aliphatic thiol imine intermediate to form polythioaminal of general structure (2) has two R groups and an R' linker moiety. Accordingly, each monomeric unit of the aliphatic polythioaminal of general structure (2) has two R groups. R is hydrogen or an electron withdrawing group. Electron withdrawing groups include —F, —$CF_3$, —$NO_2$, —Cl, —Br, —I, nitrile, and the like. Each instance of R is independently selected from the group consisting of —H, —F, —$CF_3$, and —$NO_2$. Polythioaminals of general structure (2) have an R' that is a linker moiety. Each instance of R' is independently selected from the group consisting of cycloalkyl, alkyl, alkylene glycol, acrylate, and siloxane. In some embodiments, alkylene glycol is polyalkylene glycol, acrylate is polyacrylate, and siloxane is polysiloxane. In some embodiments, each instance of R' is independently selected from the group consisting of cyclohexyl, n-butyl, and polyethylene glycol. One or more electron withdrawing R groups of an aliphatic thiol imine promotes stabilization of the imine moiety. One or more electron withdrawing R groups of an aliphatic polythioaminal promotes stabilization of thioaminal linkages of the polythioaminal. Stabilization of an imine moiety of an aliphatic thiol imine monomer and/or thioaminal linkages of a polythioaminal promotes formation of high molecular weight polythioaminals. Furthermore, stabilization of the imine moiety of thiophenol imine reduces or eliminates hexahydrotriazine formation, and a subsequent $R_2$—$NH_2$ byproduct from reaction of the hexahydrotriazine. Therefore, electron withdrawing R groups of a thiophenol imine reduce or eliminate the need for amine scavengers in polythioaminal formation reactions.

In some embodiments, 'n' of the polythioaminal of general structure (2) is an integer such that the number average molecular weight (Mn) or weight average molecular weight (Mw) of a polythioaminal of general structure (2) is between about 2,000 to about 80,000, about 5,500 to about 40,000, such as between about 10,000 to about 25,000, between about 15,000 to about 20,000.

Because polythioaminal syntheses of Scheme 1a, Scheme 1b, and Scheme 2 are carried out by the self-polymerization of imine thiols (i.e., 1:1 ratio of thiols:imines in a reaction mixture), the stoichiometric effect of starting materials on degree of polymerization is reduced or eliminated.

As a proof of principle, a 4-imino-thiophenol was self-polymerized as shown in Scheme 3.

Scheme 3

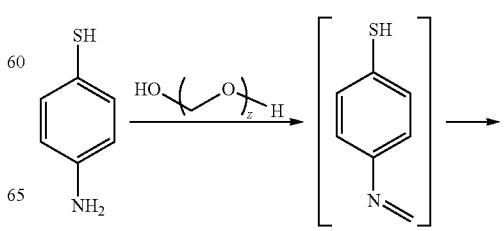

-continued

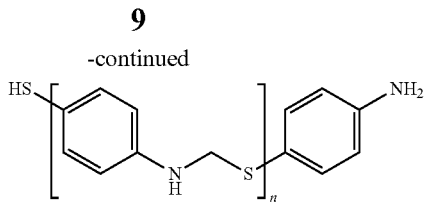

As shown in Scheme 3, 4-aminothiol is mixed with paraformaldehyde to yield 4-imino-thiophenol. 4-imino-thiophenol may be self-polymerized to yield a polythioaminal. However, self-polymerization of 4-imino-thiophenol yields only low molecular weight polythioaminals. For example, 1 g (8 mmol) of 1,4-aminothiophenol was added to a 20 mL reaction vial followed by an excess of paraformaldehyde (1 eq., 0.24 g) and stir bar. The reaction vial was then flushed with nitrogen for a period of 15 seconds then sealed and placed in an oil bath heated to 85° C. for a period of 4 hours. After reaction the crude product was dissolved in tetrahydrofuran, and gel permeation chromatography was used to characterize the resulting polymer. The polymer exhibited an $M_w$ of 4400 g mol$^{-1}$ and $M_n$ 1974 g mol$^{-1}$ and PDI of 2.2, as one would anticipate from a step-growth polymerization. These data highlight the stabilization effect that electron withdrawing groups may have on imines and promotion of high molecular weight polythioaminal formation.

Synthesis of polythioaminals utilizing self-polymerization of thiol imine monomers having one or more electron withdrawing groups further provides access to surface functionalization of high molecular weight polythioaminals grown from the surface of substrates, as illustrated in Schemes 4A-4B.

Scheme 4A

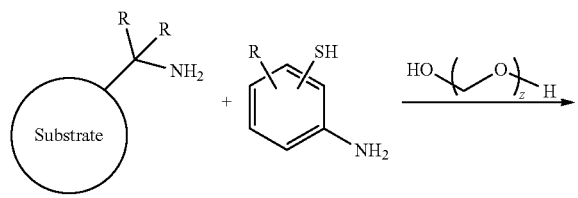

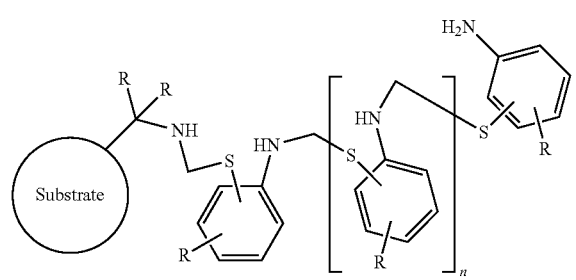

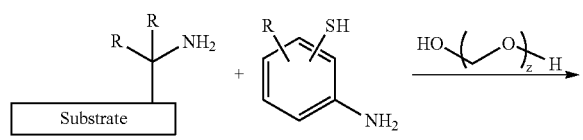

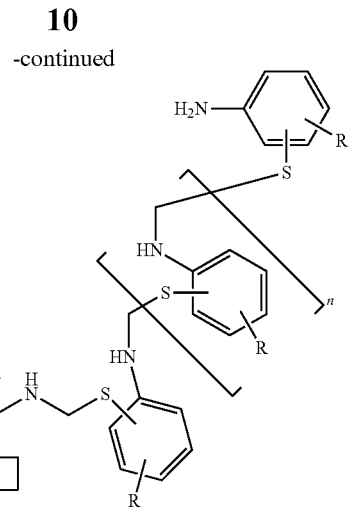

As shown in Scheme 4A, an aromatic polythioaminal may be linked to a substrate by mixing an amino-substituted substrate with aminothiophenol and paraformaldehyde. Amino-thiophenol (and accordingly each instance of R of the polythioaminal product) may be mono-, di-, tri-, or tetra-substituted where 'R' is hydrogen or an electron withdrawing group. Electron withdrawing groups include —F, —CF$_3$, —NO$_2$, —Br, —I, —Cl, nitrile, and the like. Substrates include a polymer bead, silica particle or surface. A substrate may be flat or spherical. A substrate may include an outer surface functionalized with one or more electron withdrawing groups, where each instance of R is selected from the group consisting of —H, —F, —CF$_3$, and —NO$_2$. A substrate may include an outer surface functionalized with one or more primary amine moieties. Additionally or alternatively, a substrate may be thiol-substituted with one or more thiol moieties. In embodiments where a substrate is thiol-substituted, a thiol-substituted substrate may react with an imine by nucleophilic addition of the thiol nucleophile of the substrate with an electrophilic carbon of an imine (of a thiophenol imine monomer or imine-containing terminus of an aromatic polythioaminal).

In some embodiments, 'n' of the polythioaminal moiety of a polythioaminal-substituted substrate is an integer such that the number average molecular weight (Mn) or weight average molecular weight (Mw) of the polythioaminal moiety is between about 2,000 to about 80,000, such as about 5,500 to about 40,000, such as between about 10,000 to about 25,000, between about 15,000 to about 20,000.

The reactions shown in Scheme 4A may be carried out at room temperature or the reaction may be heated to between about 30° C. to about 120° C., such as between about 50° C. to about 110° C., such as between about 85° C. to about 100° C.

Scheme 4B

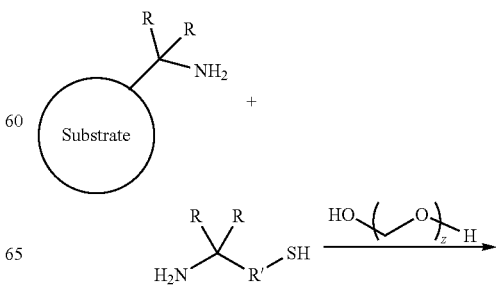

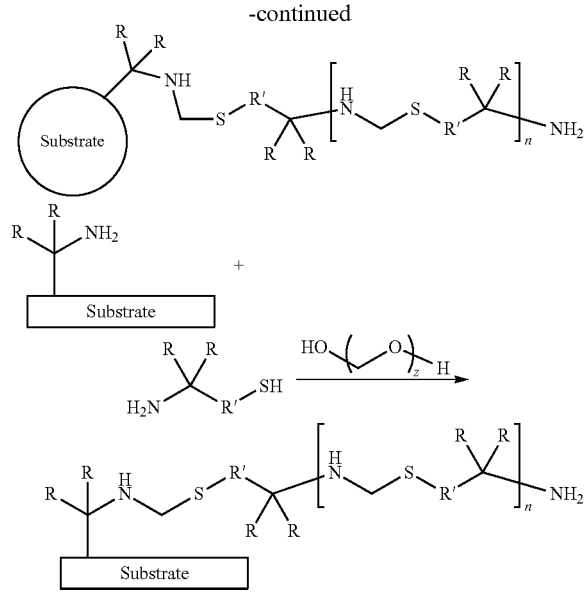

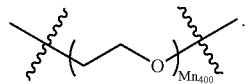

As shown in Scheme 4B, an aliphatic polythioaminal may be linked to a substrate by mixing an amino-substituted substrate with an aliphatic amino thiol and paraformaldehyde. The aliphatic amino thiol (and accordingly each instance of R of the polythioaminal product) may be substituted where each instance of R is independently selected from the group consisting of —H, —F, —CF$_3$, —NO$_2$, —Cl, —Br, —I, nitrile, and the like, corresponding to polythioaminal of general structure (2). R' is a linker moiety. Each instance of R' is independently selected from the group consisting of cycloalkyl, alkyl, alkylene glycol, acrylate, and siloxane. In some embodiments, alkylene glycol is polyalkylene glycol, acrylate is polyacrylate, and siloxane is polysiloxane. In some embodiments, each instance of R' is independently selected from the group consisting of cyclohexyl, n-butyl, polyethylene glycol 400, polymethylacrylate, and polydimethylsiloxane. Substrates include a polymer bead, silica particle or surface. As described herein, polyethylene glycol 400 is polyethylene glycol with a number average molecular weight (Mn) value of 400 g/mol. Accordingly, a polyethylene glycol moiety may be shown as follows:

A substrate may be flat or round. A substrate may include an outer surface functionalized with one or more R moieties, where each instance of R is selected from the group consisting of —H, —F, —CF$_3$, —NO$_2$, —Cl, —Br, —I, nitrile, and the like. Additionally or alternatively, a substrate may be thiol-substituted with one or more thiol moieties. In embodiments where a substrate is thiol-substituted, a thiol-substituted substrate may react with an imine by nucleophilic addition of the thiol nucleophile of the substrate with an electrophilic carbon of an imine (of an aliphatic thiol imine monomer or imine-containing terminus of an aliphatic polythioaminal).

In some embodiments, 'n' of the polythioaminal moiety of a polythioaminal-substituted substrate is an integer such that the number average molecular weight (Mn) or weight average molecular weight (Mw) of the polythioaminal moiety is between about 5,500 to about 40,000, such as between about 2,000 to about 80,000, such as about 10,000 to about 25,000, between about 15,000 to about 20,000.

The reactions shown in Scheme 4B may be carried out at room temperature or the reaction may be heated to between about 30° C. to about 120° C., such as between about 50° C. to about 110° C., such as between about 85° C. to about 100° C.

Non-limiting examples of aromatic polythioaminals according to structure (1) are shown in Table 1. Each of the aromatic polythioaminals of Table 1 has at least one R group and each instance of R throughout Table 1 is independently selected from the group consisting of fluorine, trifluoromethyl, and nitro. 'n' of the polythioaminals of Table 1 is an integer such that the number average molecular weight (Mn) or weight average molecular weight (Mw) of the polythioaminal moiety is between about 2,000 to about 80,000, such as about 5,500 to about 40,000, such as between about 10,000 to about 25,000, between about 15,000 to about 20,000.

TABLE 1

| Ex. # | Structure |
|---|---|
| 1 | ![structure] |

TABLE 1-continued
| Ex. # | Structure |
|---|---|
| 2 | 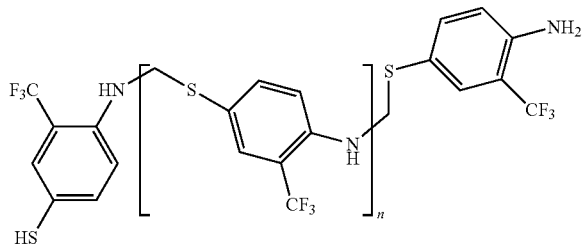 |
| 3 | 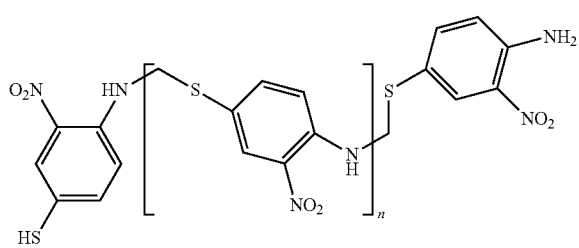 |
| 4 | 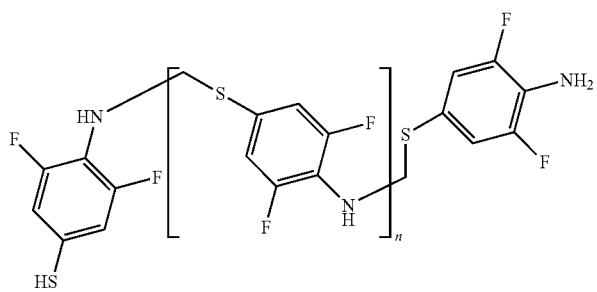 |
| 5 | 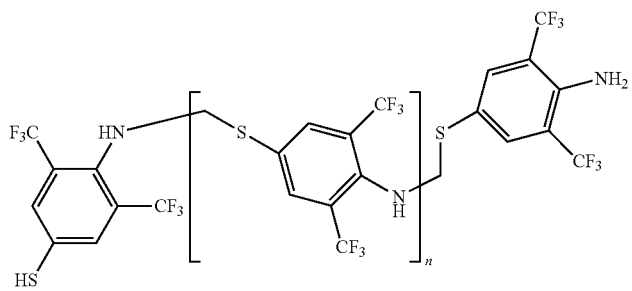 |
| 6 | 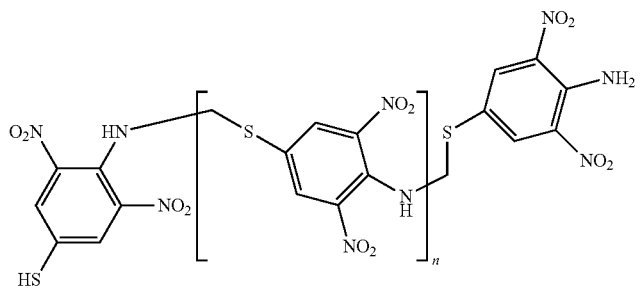 |

TABLE 1-continued
| Ex. # | Structure |
|---|---|
| 7 | 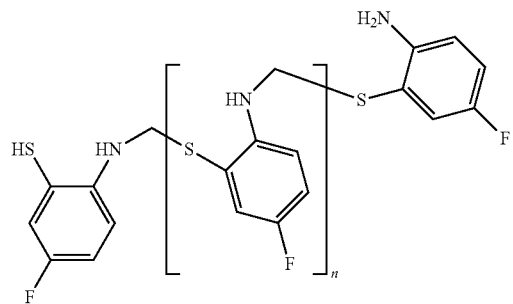 |
| 8 | 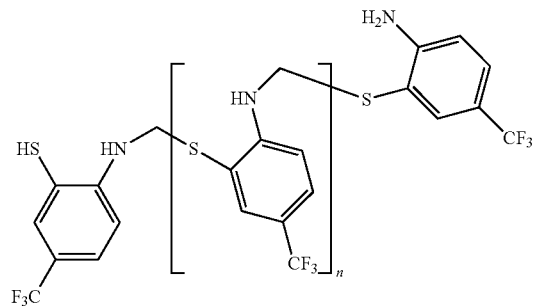 |
| 9 | 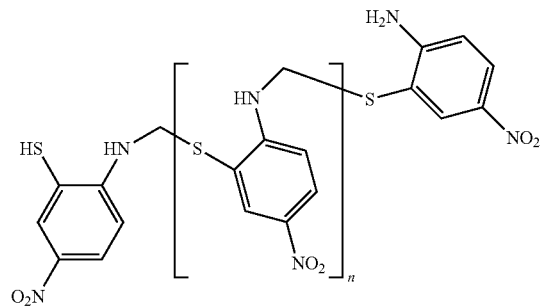 |
| 10 | 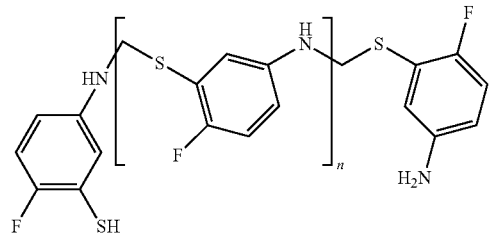 |
| 11 | 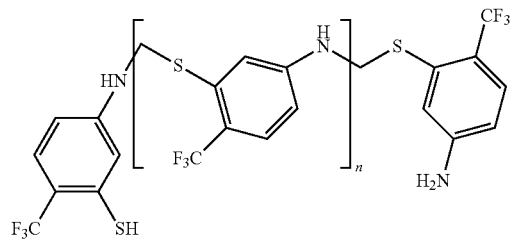 |

TABLE 1-continued

| Ex. # | Structure |
|---|---|
| 12 | |

Non-limiting examples of aliphatic polythioaminals according to structure (2) are shown in Table 2. Some of the chemical compounds of Table 2 have at least one R group and each instance of R throughout Table 2 is independently selected from the group consisting of hydrogen, fluorine, and trifluoromethyl. Each of the chemical compounds of Table 2 has at least one R' group and each instance of R' throughout Table 2 is independently selected from the group consisting of para-cyclohexyl, n-butyl, polyethylene glycol 400, polymethylacrylate, and polydimethylsiloxane. 'n' of the polythioaminals of Table 1 is an integer such that the number average molecular weight (Mn) or weight average molecular weight (Mw) of the polythioaminal moiety is between about 2,000 to about 80,000, about 5,500 to about 40,000, such as between about 10,000 to about 25,000, between about 15,000 to about 20,000. 'q' is an integer between 1 to about 25, such as 1 to about 10. 'z' is an integer between 1 to about 25, such as 1 to about 10.

TABLE 2

| Ex. # | Structure |
|---|---|
| 1 | |
| 2 | |
| 3 | |
| 4 | |

TABLE 2-continued

| Ex. # | Structure |
| --- | --- |
| 5 | |
| 6 | |
| 7 | |
| 8 | |
| 9 | |
| 10 | |
| 11 | |

TABLE 2-continued

| Ex. # | Structure |
|---|---|
| 12 | |
| 13 | |
| 14 | |
| 15 | |
| 16 | |
| 17 | |

TABLE 2-continued

| Ex. # | Structure |
|---|---|
| 18 | |
| 19 | |
| 20 | |

Compounds and syntheses described herein provide access to high molecular weight polythioaminals and polythioaminal-substituted substrates. Compounds and syntheses described herein provide stabilized imine formation and stabilized hemiaminal linkage formation. Compounds and syntheses described herein provide reduction or elimination of hexahydrotriazine formation during polythioaminal syntheses which reduces or eliminates a need for amine scavengers in polythioaminal formation reactions. Furthermore, compounds and syntheses described herein provide self-polymerization of imine thiols, where a stoichiometric effect of starting materials on degree of polymerization is reduced or eliminated. Polythioaminals described herein may be used as polymerization catalysts. In some embodiments, high molecular weight polymers synthesized using polythioaminal catalysts described herein have a polydispersity index (PDI) of between about 1.00 to about 1.2, for example about 1.05.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A method of synthesizing a polythioaminal, comprising:

mixing a thiol amine with an aldehyde to form a thiol imine; and
   self-polymerizing the thiol imine to form a polythioaminal, wherein the polythioaminal has a number average molecular weight (Mn) or weight average molecular weight (Mw) between about 2,000 to about 80,000.

2. The method of claim 1, wherein the number average molecular weight (Mn) or weight average molecular weight (Mw) of the polythioaminal is between about 15,000 to about 20,000.

3. The method of claim 1, further comprising mixing a benzothiazole with a reducing agent to form the thiol amine.

4. The method of claim 1, wherein the aldehyde is paraformaldehyde.

5. The method of claim 1, further comprising adding a solvent selected from the group consisting of N-methylpyrrolidone, dimethylsulfoxide, N,N-dimethylformamide, N,N-dimethylacetamide, propylene carbonate, propylene glycol methyl ether acetate, methanol, ethanol, isopropanol, and acetic acid.

6. The method of claim 1, wherein the polythioaminal is of the formula:

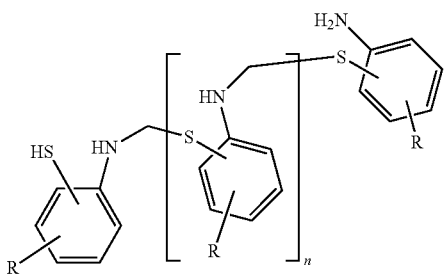

wherein each instance of R is an electron withdrawing group, and wherein n is an integer, and the polythioaminal has a number average molecular weight (Mn) or weight average molecular weight (Mw) between about 2,000 to about 80,000.

7. The method of claim 1, wherein the polythioaminal is of the formula:

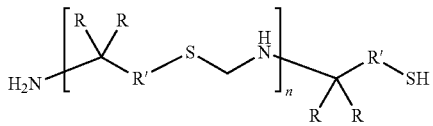

wherein each instance of R is independently selected from the group consisting of —H, —F, —CF$_3$, and —NO$_2$, wherein each instance of R' is independently selected from the group consisting of cycloalkyl, alkyl, alkylene glycol, acrylate, and siloxane, and wherein n is an integer, and the polythioaminal has a number average molecular weight (Mn) or weight average molecular weight (Mw) between about 2,000 to about 80,000.

8. The method of claim 1, wherein the thiol amine is an aminothiophenol or an aliphatic amino thiol.

9. The method of claim 1, further comprising contacting the thiol imine with an amine-substituted substrate.

10. A method of synthesizing a polythioaminal, comprising:
    mixing an aminothiophenol or aliphatic amino thiol with an aldehyde to form a thiol imine; and
    self-polymerizing the thiol imine to form a polythioaminal, wherein the polythioaminal has a number average molecular weight (Mn) or weight average molecular weight (Mw) between about 2,000 to about 80,000.

11. The method of claim 10, further comprising mixing a benzothiazole with a reducing agent to form the aminothiophenol.

12. The method of claim 10, wherein the aldehyde is paraformaldehyde.

13. The method of claim 10, further comprising adding a solvent selected from the group consisting of N-methylpyrrolidone, dimethylsulfoxide, N,N-dimethylformamide, N,N-dimethylacetamide, propylene carbonate, propylene glycol methyl ether acetate, methanol, ethanol, isopropanol, and acetic acid.

14. The method of claim 10, further comprising contacting the thiol imine with an amine-substituted substrate.

15. A method of synthesizing a polythioaminal, comprising:
    mixing an aminothiophenol with paraformaldehyde to form a thiol imine; and
    self-polymerizing the thiol imine to form a polythioaminal, wherein the polythioaminal has a number average molecular weight (Mn) or weight average molecular weight (Mw) between about 2,000 to about 80,000, and the polythioaminal is of the formula:

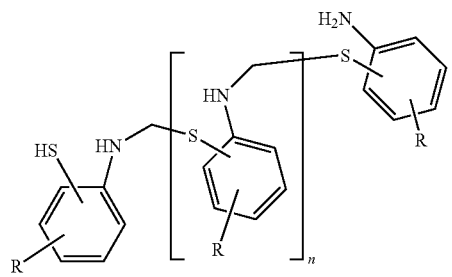

wherein each instance of R is an electron withdrawing group, and wherein n is an integer.

16. The method of claim 15, wherein R is, independently in each instance, —F, —CF$_3$, —NO$_2$, —Cl, —Br, —I, or nitrile.

17. The method of claim 15, further comprising contacting the thiol imine with an amine-substituted substrate.

* * * * *